United States Patent [19]

McFarlin

[11] 4,143,909
[45] Mar. 13, 1979

[54] WATER FILLED SEAT CUSHION

[76] Inventor: Lloyd McFarlin, P.O. Box 430, Brentwood, Calif. 94513

[21] Appl. No.: 859,582

[22] Filed: Dec. 12, 1977

[51] Int. Cl.² .............................................. A47C 27/08
[52] U.S. Cl. ......................................... 297/284; 5/91; 5/371; 297/231
[58] Field of Search ................................. 5/366–371, 5/231; 297/455, 456, 284

[56] References Cited

U.S. PATENT DOCUMENTS

| 697,279 | 4/1902 | Schmied | 297/456 |
| 3,848,282 | 11/1974 | Viesturs | 5/370 |
| 4,073,021 | 2/1978 | Carlisle | 5/370 |

Primary Examiner—Casmir A. Nunberg
Attorney, Agent, or Firm—Phillips, Moore, Weissenberger, Lempio & Majestic

[57] ABSTRACT

A seat cushion is disclosed, including means for removably attaching said cushion to a vehicle seat or the like, said cushion having a fluid filled cavity and an upper cavity, partially filled with fluid, the upper cavity including a plurality of seams positioned therein and defined vertically along a substantial length of said cavity, these seams acting to define a plurality of secondary cavities within the upper cavity which are sealed one from another except at the upper end thereof so that fluid may intermingle between such secondary cavities only at that point.

11 Claims, 3 Drawing Figures

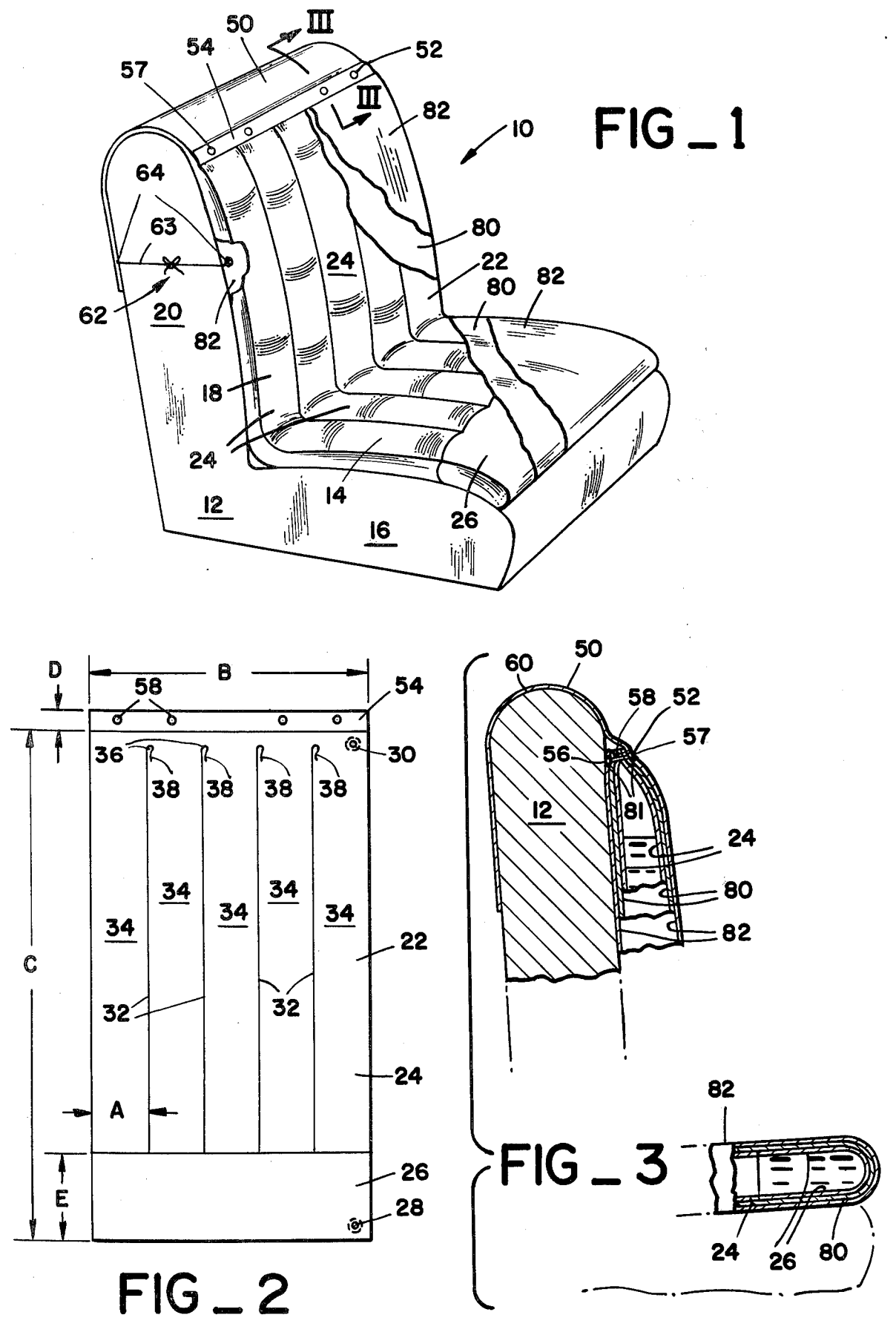

FIG_1

FIG_2

FIG_3

WATER FILLED SEAT CUSHION

BACKGROUND OF THE INVENTION

In certain vehicles, especially trucks, the driver, and passengers if any, are subjected to a great deal of vibration and road shock during travel in the vehicle. Prior art seat cushions have, in general, been inadequate to provide relief from this discomfort. Most seat cushions or seats known to the applicant have involved air inflated cells or cavities, wherein the shape of the cavities themselves provide support for any existing seat back portion. Only one prior art seat cushion is known to the applicant which includes a water filled cavity, and further, a water filled cavity designed to be only partially filled with fluid. This structure, however, does not disclose any seat back portion designed to be fluid filled, nor means for supporting such a seat back. Thus, no prior art seat cushion is known to the applicant wherein a plurality of fluid filled cavities are included, with an upper cavity designed to be only partially filled with water, this upper cavity further including precisely spaced seams defining secondary cavities thereby. In addition, no fluid filled seat cushion is known including means for retaining said cushion against the seat back, such that the seat cushion can be used in a vehicle or the like.

SUMMARY OF THE INVENTION

The present invention is a seat cushion adapted such that it will conform to the shape of a seat in a vehicle or the like with a lower portion thereof resting on the seat bottom and the upper portion thereof against the seat back. The present invention provides a flexible resilient body portion designed to be water filled, and comprising an upper and lower cavity, the upper cavity designed to be only partially filled with fluid, so that a higher degree of comfort can be obtained than would otherwise be possible. The upper cavity is further subdivided by a plurality of seams, such that a plurality of vertical secondary cavities of equal width are defined in the upper cavity. Water or fluid in a given secondary cavity can only intermingle with water from another secondary cavity at the top ends thereof, to thereby provide further support for the person using the seat cushion of the present invention. Both the upper and lower cavities include separate fluid fill valve means.

Means are also provided to support the upper cavity of said body portion against the seat back. In the preferred embodiment, this means for supporting includes seat top overlapping means and snaps or other fastening means on the top end of said upper cavity such that said seat overlapping means may be removably fastened to the upper cavity portion.

A safety liner of vinyl may also be provided to protect against accidental leaking of the water filled body portion. The liner is slipped over the body portion and fastened to the top of the body portion at the liners' open end. An outer cloth cover which is slipped over the vinyl liner may also be provided to increase the comfortableness of the apparatus of the present invention. Therefore, an object of the present invention is to provide a seat cushion for a vehicle or the like which maximizes the comfort and absorbs road shocks and vibrations which are felt during the operation of the vehicle.

Another object of the present invention is to provide a seat cushion which can be simply and easily installed on a vehicle seat, to provide support for the portion of the seat cushion which rests against the seat back.

A still further object of the present invention is to provide an upper cavity designed to be only partially filled with water, to provide just enough of a balance between support and comfort for the user thereof.

These and other objects and advantages of the present invention will become more apparent upon reference to the accompanying drawings and following description.

BRIEF DESCRIPTION OF THE DRAWINGS

FIG. 1 is a perspective view of the present invention, shown resting in an operative position on a vehicle seat or the like and including a breakout showing the relationship between the resilient body portion, the safety liner, and the outer cloth cover;

FIG. 2 is a top plan view of the resilient body portion of the seat cushion of the present invention; and FIG. 3 is a side cross-sectional view, in detail, of a preferred means for removably attaching the upper portion of the seat cushion of the present invention to the means for retaining said seat cushion against the seat.

DESCRIPTION OF A PREFERRED EMBODIMENT

A seat cushion according to the present invention is shown at 10 in FIG. 1, installed on a vehicle seat or the like 12. The lower portion 14 of the seat cushion rests on the bottom 16 of seat 12 and the upper portion 18 of the seat cushion rests against the seat back 20.

As more clearly seen in FIG. 2, the seat cushion 10 includes a body portion 22 formed of a flexible, resilient, fluid impervious sheet material. In the preferred embodiment, the material to be used is clear plastic vinyl. The body portion 22 of the seat cushion is divided up into an upper cavity 24 and a lower cavity 26. Both cavities 24 and 26 are designed to retain a fluid, such as water, therein. The lower cavity is filled with fluid by means of a conventional fluid fill valve means 28. The upper cavity 24 is filled with fluid in a similar manner by means of a second fluid fill valve means 30. In the preferred embodiment, the lower cavity 26 is designed to be completely filled with water. The upper cavity, on the other hand, is contemplated as being only partially filled with water. The reason for this partial filling will be described hereinbelow.

The upper cavity 24 contains a plurality of seams 32 which are defined in said cavity 24 vertically along a substantial length of cavity 24. These seams 32 define a plurality of secondary cavities 34 within the upper cavity 24 which are sealed from one another from fluid intercommunication except at the upper ends 36 thereof. Only at these upper ends 36, each defined at the same height in said cavity with respect to one another, may fluid intermingle between said secondary cavities 34. In the preferred embodiment, these ends 36 are further strengthened by means of a droptail design formed thereon, as shown at 38.

Means are further provided for supporting said upper portion 18 of said body portion 22 against the seat back 20, as shown in FIG. 1. In the preferred embodiments, this means comprises the cloth outer cover 82 surrounding the body portion 22. This cover 82 includes seat top overlapping means 50 and fastening means 52. The fastening means 52 provides means for coupling said cover 82 to said body portion 22. The fastening means 52, as seen in FIG. 2, includes a flange portion 54 formed on the upper end of said upper cavity 24 including a plurality of holes 58 defined therethrough. This flange portion 54 comprises a double thickness of said flexible sheet material formed by bonding together the two sides of the body portion 22. As further seen in FIGS. 1 and 2, and in detail in FIG. 3, the fastening means includes snaps or other fastening members, 56 and 57, formed on either side of cover 82. The fastening members 56, 57 are formed to fit through the holes 58 in the flange 54. The fastening members 57 are preferably formed on that portion of cover 82 comprising said seat top overlapping means 50. Each member 56 is designed to releasably fasten with a corresponding member 57, with said flange 54 secured therebetween.

In the preferred embodiment, the seat top overlapping means comprises rectangular section of material 60 attached to the cloth cover 82 as shown in FIGS. 2 and 3, at its bottom edge. The fastener members 57 are attached along this edge thereof for enabling the fastening of said material to said upper portion 18 of the seat cushion 10. As seen in FIGS. 1 and 3, this material 60 is positioned over the top of the seat back 20 for enabling the fastening of said material, and thereby seat cushion 10, to said seat back 20. The material, and therewith the upper portion of said seat cushion, is removably attached to said seat by means of second fastening means 62 positioned on each side of seat 12 on its seat back 20. In the preferred embodiment, the second fastening means 62 can be lengths of rope or tie strings 63, which are fed through holes 64, each set of which are positioned at the back corners of the material 60. These lengths of rope fasten the back corners of said fabric 60 in a conventional manner to that portion of said cover 82 lying on the seat 12, thereby securing the material to the top of the seat. Note that a piece of material shaped to conform in a fitted relationship to the top of the seat 12, and having fastener member 57 at its lower front edge thereof, would be an alternate means of securing the material to the top of the seat back 20.

A vinyl safety liner 80 may also be slipped over said body portion 22, between it and cover 82 to protect against leakage if the body portion 22 begins to leak fluid. The top of said liner 80 would include holes 81 therethrough, as seen in FIG. 3 to enable fastening, by means of fastener 56 and 57 of said liner 80 to said cover 82 and body portion 22.

Referring again to FIG. 2, the seams 32, defining secondary cavities 34 thereby, are spaced apart a predetermined distance to maximize the comfort of the seat cushion 10 of the present invention. It was found that if these seams are too close together, the resultant smaller width of the secondary cavities 34 would allow the fluid therein to compress too much, thereby making the cushion 10 too hard. Similarly, if the seams are spaced too far apart, too much play is generated in the cushion, so that there is no stability of the fluid therein, i.e. sloshing of the fluid in the cavity would result. In the preferred embodiment, the distance A shown in FIG. 2 and corresponding to the width of each secondary cavity 34, is defined to be approximately five inches (12.7 cm). This dimension was found to be in the area where the above described problems of too narrow or too large a width for the secondary cavities 34 is resolved.

Note also that the overall dimensions of the body portion 22 of the seat cushion 10 of the present invention include: a width B, shown in FIG. 2, of 25 inches (63.5 cm); a height C of 40 inches (101.6 cm); and a width for the flange portion 54, shown at D, of 2 inches (5.08 cm).

Finally, the lower cavity 26 includes a width E of 8 inches (20.32 cm). This cavity 26 serves a dual purpose. First cavity 26 prevents the water being forced from that area back into the upper portion of the cushion when a person sits thereon. Secondly, it provides further support and comfort to the cushion user as described below.

It was found that by designing cavity 26 to be 8 inches wide, when cushion 10 is used in a normal sitting position, this cavity 26 strikes the body of the user in such a way so as to provide additional support, in that it tends to prevent the user from sliding forward on the cushion. Also when used in a normal sitting position, this 8 inch width provides support for the upper portions of the drivers legs, without any abrupt contour changes, such that with the aid of the constantly moving water, the tendency for the users legs to go to sleep is substantially reduced. Note that any change in the size of this lower cavity 26 has a direct effect on the action or movement of water in the upper chamber.

It is to be understood that the foregoing description is merely illustrative of a preferred embodiment of the invention and that the scope of the invention is not to be limited thereto but is to be determined by the scope of the appended claims.

I claim:

1. A seat cushion adapted to conform to the shape of a seat in a vehicle or the like such that a lower portion thereof rests on the seat bottom and an upper portion thereof is against the seat back, said cushion comprising:
    a body portion formed of flexible resilient, fluid impervious sheet material, and including:
    a lower fluid filled cavity;
    an upper partially fluid filled cavity;
    a plurality of seams positioned in said upper cavity and defined vertically along a substantial length of said cavity, said seams acting to define a plurality of secondary cavities within said upper cavity which are sealed from one another from fluid intercommunication except at the upper end thereof, for enabling fluid intermingling between said secondary cavities only at that point; and
    means removably attachable to said body portion for supporting said upper cavity against said seat back, said body portion positionable on a seat or the like such that said lower cavity and a portion of said upper cavity rests on said seat bottom, the rest of said upper cavity lying against said seat back.

2. The seat cushion of claim 1 wherein said plurality of seams are defined in a parallel relationship one with the other, with the upper end of each defined at the same height with respect to one another.

3. The seat cushion of claim 2 wherein each said seam further defines a droptail at the upper end thereof to strengthen the seam thereby.

4. The seat cushion of claim 2 wherein each said seam is spaced equidistant from adjoining seams, said spacing between each said seam being sized with respect to the characteristics of the sheet material of said body portion such that both excessive hardness of the cushion due to constriction of the flow of fluid, and instability of the fluid therein are minimized.

5. The seat cushion of claim 4 wherein the spacing between adjoining seams is within the range of 4 and 6 inches (between 10.16 cm and 15.24 cm).

6. The seat cushion of claim 1 wherein said lower cavity is defined to have an optimum width of 8 inches (20.32 cm) to further maximize the support and comfort of said seat cushion.

7. The seat cushion of claim 1 wherein said means for supporting said upper cavity against said seat back comprises:
   seat top overlapping means;
   first fastening means; and
   second fastening means,
   said first fastening means acting to operatively connect said seat top overlapping means to said body portion, said second fastening means operatively enabling the securing of said seat top overlapping means to said seat back.

8. The seat cushion of claim 7 wherein said first fastening means comprises:
   a flange portion formed on the upper end of said upper cavity including a plurality of holes defined through said flange portion; and
   snap members formed on said seat top overlapping means having a shape and defined in positions such that said snap members connect through said flange portion holes, such that said body portion may thereby be removably attached to said seat top overlapping means.

9. The seat cushion of claim 8, wherein said seat top overlapping means further comprises an outer cloth cover defined in a shape to surround said body portion.

10. The seat cushion of claim 9 further comprising a vinyl safety liner including holes defined in the top thereof for fastening said safety liner to said body portion by means of said first fastening means, said vinyl safety liner defined in a shape of a bag for enabling the placement of said body portion therein, to prevent thereby leaking of fluid from said body portion to areas external to the seat cushion, said vinyl safety liner further defined in a position between said body portion and said cloth cover.

11. The seat cushion of claim 1 further comprising:
   first fluid fill valve means operatively positioned to enable adjustment of the amount of fluid in said lower fluid filled cavity; and
   second fluid fill valve means operatively positioned to enable adjustment of fluid in said upper fluid filled cavity.

* * * * *